Sept. 18, 1934.    G. B. NICOLL    1,974,378
VALVE
Filed Aug. 30, 1930
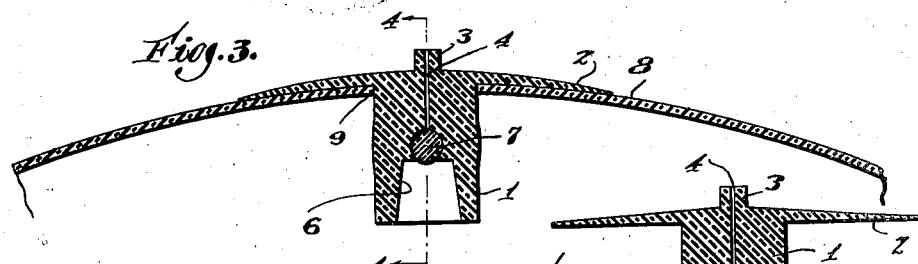
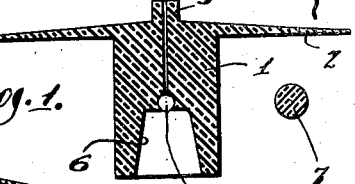
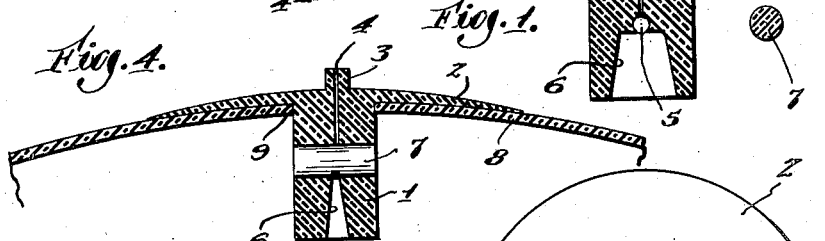
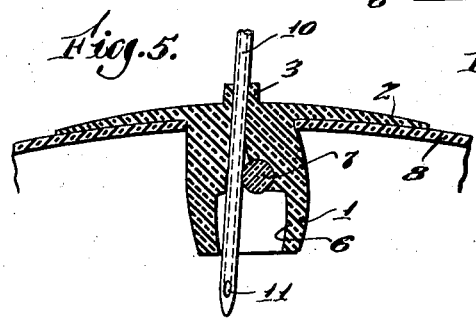
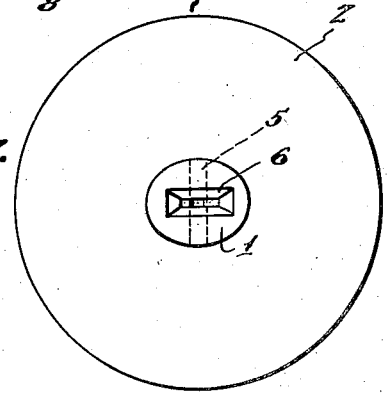
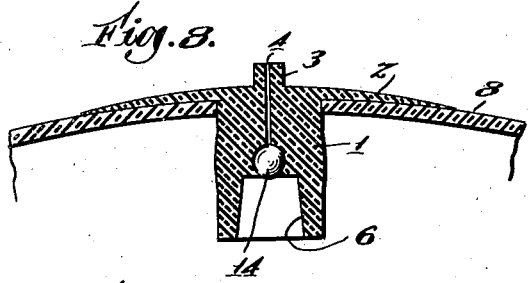
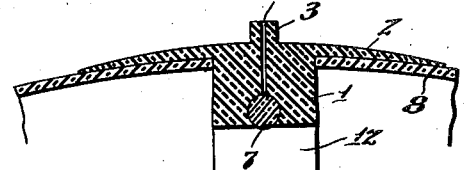
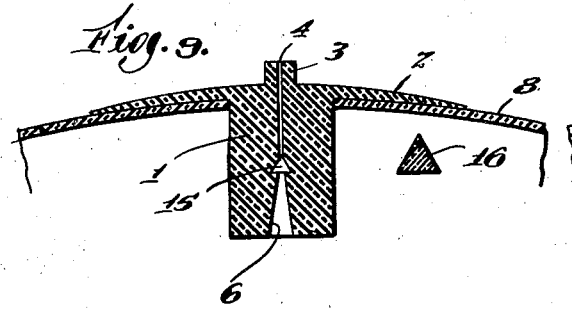
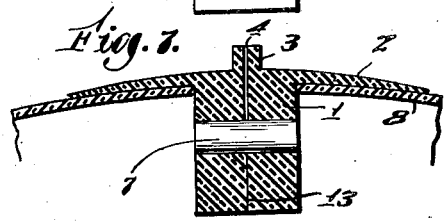
Inventor
George B. Nicoll
by James R. Hodder
Attorney Patented Sept. 18, 1934

1,974,378

UNITED STATES PATENT OFFICE 1,974,378

VALVE

George B. Nicoll, Andover, Mass., assignor to Tyer Rubber Company, Andover, Mass., a corporation of Massachusetts Application August 30, 1930, Serial No. 478,865

13 Claims. (Cl. 273—65)

My present invention relates to valves, and more particularly to a novel and improved valve for use in conjunction with bladders or other inflatable articles.

An object of the present invention is the provision of a valve which will be simple to operate and which will be efficient in carrying out its function of sealing the article to which it is attached, after said article has been inflated.

Another object of the invention is the provision of a valve which will be simple and inexpensive to manufacture and assemble.

Another object of the invention resides in the provision of a valve constructed and arranged to permit easy insertion and withdrawal of an inflating tool, such as an inflating needle.

When utilizing valves in conjunction with bladders for footballs, basketballs, soccerballs, and other play or sport balls, it is desirable that these valves shall be relatively light in weight, and shall have no metallic parts adjacent to the outer or exposed portion thereof.

In carrying out by present invention, I construct the valve with a stem and a flange at the upper end thereof for adhesion to the bladder to which the valve is attached. Through the stem I form an air passage, said passage extending only partially through the stem and communicating with a recess, said recess in turn communicating with a larger recess, slot, or slit. The bladder or other article to which the valve is attached is inflatable by means of an inflating tool such as a hollow needle.

In the smaller recess which communicates with the air passage I place a device preferably of less resilience than the material of the stem itself, said stem being preferably formed of relatively soft rubber. The device which is inserted in said recess is of considerably greater size than the said recess. Thus, when the device is forced into said recess there will be a contracting of the material of the stem about said device, thus firmly sealing the end of the air passage which is adjacent to said device and preventing inadvertent deflation of the inflated article. The device referred to is preferably a pin of hard rubber, although metal or any other suitable material of less resilience than the rubber of the stem may be utilized if desired. I may also utilize, in place of the pin referred to, a ball seated in said recess and functioning in the same manner as the pin above referred to. Said pin may be of any desirable shape, either cylindrical, triangular in cross section, or any other shape which will permit facile penetration of the valve by an inflating tool.

Other features of the invention, details of construction, and advantages, will be hereinafter more fully pointed out as the description of the invention progresses.

Referring to the drawing, illustrating preferred embodiments of the invention,

Fig. 1 is a vertical central sectional view of my novel valve before application of the sealing device thereto;

Fig. 2 is a bottom plan view of the valve of Fig. 1;

Fig. 3 is a vertical sectional view of the valve attached to an inflatable article;

Fig. 4 is a vertical sectional view on the line 4—4 of Fig. 3;

Fig. 5 is a view similar to Fig. 3 with an inflating tool in inflating position;

Fig. 6 is a view similar to Fig. 3, illustrating a modified bottom or inner end of valve;

Fig. 7 is a view similar to Fig. 6 with a still further modified form of valve end;

Fig. 8 is a vertical sectional view of my novel valve illustrating the use of a ball instead of a pin or rod; and Fig. 9 is a vertical sectional view illustrating a modified type of valve wherein a pin or rod of triangular cross section is utilized as the sealing device.

Referring now to the drawing for a particular description of the invention, my novel valve comprises a stem 1 having a flange 2 preferably formed integral therewith and radiating outwardly therefrom. A nipple 3 is formed projecting upwardly centrally of said stem, and an air passage 4 is formed through the nipple 3 and partially through the stem 1, communicating, at its inner end with a recess 5, here illustrated as a tubular channel laterally through the stem 1. The recess 5 in turn communicates with the larger recess 6 formed at the open end of the stem 1. Into the recess or channel 5 I force a pin or rod 7, which is preferably of hard rubber, but which may be of any suitable material of less resilience than the material of the stem 1, said stem being preferably formed of relatively soft rubber. The device 7 is of considerably greater size than the recess 5, so that when forced therein there will be a compression of the rubber surrounding the device 7 and a contraction of said rubber around said device.

The stem of the valve as thus far formed is then inserted through a hole or aperture 9 in a bladder 8, the flange 2 being affixed to the bladder 8 by suitable cement or other adhesive between the bladder 8 and the under surface of the flange 2. Preferably sufficient adhesive is provided to cause a flow of same through the hole 9 to adhere to the top of the stem 1, to further increase the adhesion and solidify the union between the valve and the bladder. The valve as illustrated in Figs. 3 and 4 is now in condition to receive a suitable inflating tool such as the hollow needle 10 having an outlet 11 adjacent to its free end, the extreme end of said needle being rounded to prevent catching of the needle in the rubber of the valve as said needle is being forced therethrough.
As the needle 10 is inserted through the passage 4 it will come in contact with the device 7, displacing said device and permitting passage of the needle 10 by the same and into the recess 6, and thence to the interior of the bladder or other article to be inflated. When the article 8 has been inflated to the desired degree, the needle 10 is withdrawn. Thereupon the device 7 will return to normal position and the contraction of the rubber of the stem 1 about the device 7 will thoroughly and effectually seal the valve, preventing leakage of any air outwardly through the air passage 4.

The article 8 may be deflated in the same manner, that is, by inserting a hollow tool or needle as illustrated in Fig. 5, and permitting the air to exhaust through the needle. There will be no deflation of the bladder while the same is being inflated because of the fact that the needle 10 is of greater diameter than the passage 4, the contraction of the rubber of the stem 1 and nipple 3 about the needle sealing the article 8 at this point during inflation.

In Fig. 6 I have illustrated a slightly modified type of stem wherein, instead of the recess 6, I provide the inner end of the stem with a slot 12 extending there across.

In Fig. 7 I have illustrated a still further modification wherein a slit 13 is formed, communicating with the recess 5. Either of these forms of stem is satisfactory and their use is optional, it only being necessary that the recess, slot or slit be so formed as to permit the entrance of the needle 10 thereinto after said needle has passed by the device 7.
In Fig. 8 I have illustrated a still further modification, wherein, in place of the tubular lateral channel 5, I provide a spherical recess, and press therein a ball 14, of hard rubber, metal, or other suitable or desirable material.
In Fig. 9 I have illustrated a triangular shaped channel 15 communicating with the air passage 4 and recess 6, and into this channel 15 I force the rod or device 16 which is triangular in cross section as illustrated in Fig. 9.
The various forms of pins illustrated herein are for illustrative purposes only, as any shape of pin may be utilized so long as the passage of the needle 10 through the valve is permitted.

The different forms of pins, as well as the different forms of inner valve ends, are all within the range of the present invention, and since I believe that the valve illustrated and described herein is novel, I have, therefore, claimed the same broadly in this application.
While I have necessarily described my present invention somewhat in detail, it will be appreciated that I may vary the size, shape, and arrangement of parts within reasonably wide limits without departing from the spirit of the invention.

My invention is further described and defined in the form of claims as follows:

1. A valve for inflatable articles, comprising a rubber stem portion having an open ended air passage extending longitudinally through a part of said stem, said stem having a recess therein communicating with one end of said air passage, said stem having a second recess therein communicating with said first recess and with the interior of the inflatable article to which said stem is attached, and a sealing device confined in said first recess only by the material of said stem adjacent thereto and closing said air passage, said sealing device being substantially surrounded by the walls of said recess.

2. A valve for inflatable articles, comprising a rubber stem portion having an open ended air passage extending longitudinally through a part of said stem, said stem having a recess therein communicating with one end of said air passage, said stem having a second recess therein communicating with said first recess and with the interior of the inflatable article to which said stem is attached, and a sealing device of greater size than said first recess confined in said recess by the material of said stem adjacent thereto and closing said air passage, said sealing device being substantially surrounded by the walls of said recess.

3. A valve for inflatable articles, comprising a rubber stem portion having an open ended air passage extending longitudinally through a part of said stem, and adapted to receive an inflating device said stem having a recess therein communicating with one end of said air passage, said stem having a second recess therein communicating with said first recess and with the interior of the inflatable article to which said article is attached, and a sealing device of greater size than said first recess located in said recess and substantially surrounded by the walls thereof and closing said air passage, said sealing device being of less resilience than said rubber stem and adapted to be displaced laterally with respect to said air passage by said inflating device against the compression of the rubber of said stem.

4. A valve for inflatable articles comprising a rubber stem portion having an open ended air passage extending longitudinally through a part of said stem, said stem having a recess extending laterally therethrough and communicating with one end of said air passage, said stem having a second recess therein communicating with said first recess and with the interior of the inflatable article to which said stem is attached, and an elongated sealing device of greater size than said first recess located in said recess and closing said air passage.

5. A valve for inflatable articles comprising a rubber stem portion having an open ended air passage extending longitudinally through a part of said stem, said stem having a recess extending laterally therethrough and communicating with one end of said air passage, said stem having a second recess therein communicating with said first recess, and with the interior of the inflatable article to which said stem is attached said second recess being positioned at an angle to said first recess, and means confined in said first recess by the pressure of its walls to close said air passage.

6. A valve for inflatable articles comprising a resilient rubber stem portion having an open ended air passage extending longitudinally through a part of said stem and adapted to receive an inflating device, said stem having a recess extending laterally therethrough and communicating with one end of said air passage, an elongated sealing device of greater diameter than the normal diameter of said recess, said sealing device being held in said recess by the compression of said resilient rubber, said stem having a second recess therein communicating with said first recess and with the interior of the inflatable article to which said stem is attached, said sealing device being displaceable laterally with respect to said air passage by said inflating device.

7. A valve for inflatable articles comprising a resilient rubber stem portion having an open ended air passage extending longitudinally through a part of said stem and adapted to receive an inflating device, said stem having a recess extending laterally therethrough and communicating with one end of said air passage, an elongated sealing device of greater diameter than the normal diameter of said recess, said sealing device being held in said recess by the compression of said resilient rubber only, said stem having a second recess therein communicating with said first recess and with the interior of the inflatable article to which said stem is attached, said sealing device being of such a shape as to permit the passage of the inflating device past the same and into said second recess, said sealing device being displaced laterally by said inflating device and returning to normal position on withdrawal of said inflating device, whereupon the compression of the resilient rubber stem will hold said sealing device in position to close said air passage.

8. A valve for inflatable articles comprising a resilient rubber stem portion having an open ended air passage extending longitudinally through a part of said stem and adapted to receive an inflating device, said stem having a recess extending laterally therethrough and communicating with one end of said air passage, an elongated sealing device of greater diameter than the normal diameter of said recess, said sealing device being held in said recess by the compression of said resilient rubber only, said stem having a second recess therein communicating with said first recess and with the interior of the inflatable article to which said stem is attached, said sealing device being of such a shape as to permit the passage of the inflating device past the same and into said second recess, said sealing device being displaced laterally by said inflating device and returning to normal position on withdrawal of said inflating device, whereupon the compression of the resilient rubber stem will hold said sealing device in position to close said air passage, said second recess being so arranged as to admit the inflating device thereto and therethrough after passage of said inflating device past said sealing device.

9. A valve for inflatable articles, comprising a rubber stem portion having a passage extending therethrough and adapted to receive an inflating device, and a sealing member embedded in the device, and normally disposed in said passage and retained therein by the tension of the material of said stem adjacent thereto, said member being laterally displaceable by said inflating device in traversing the passage.

10. A valve for inflatable articles, comprising a rubber stem portion having a passage extending longitudinally therethrough and adapted to receive an inflating device, and a sealing member embedded in the stem, and of normally greater diameter than the diameter of said passage normally disposed in said passage and retained therein by the tension of the material of said stem adjacent thereto, said member being laterally displaceable by said inflating device in traversing the passage.

11. An all-rubber valve for inflatable articles comprising a rubber stem formed with a passage therethrough and adapted to receive a hollow inflating tool, a rubber sealing member fitted within said stem and lying wholly intermediate the ends of said passage and normally closing said passage and preventing escape of air therethrough, said stem and member being of such relative size and resiliency to normally close the passage by the stresses in the contacting parts of said stem and member and sufficiently yielding to permit the passage of said inflating tool.

12. A valve of the kind described for inflatable articles, comprising a rubber neck portion with a passage therethrough, and a rubber member sealing said passage and lying wholly intermediate the ends of the passage, said member and stem being normally under stress to effect the sealing, and both said stem and member cooperating to afford sufficient yielding to permit an inflating tool to be applied through said passage and beyond the sealing member.

13. An all-rubber valve for inflatable articles comprising a rubber stem portion formed with a passage therethrough adapted to guide a hollow inflating tool, a rubber member blocking and sealing said passage within the inner portion intermediate the end openings of the passage, said member having a greater diameter than that of the passage where said member is in contact with the walls of said passage to effect the sealing action, said member being held in position in the inner portion of the passage by the stresses of the contacting parts of stem and member, and said stem and member being sufficiently yielding to permit the passage of the inflating tool.

GEORGE B. NICOLL.